Sept. 4, 1962  E. ANDRES  3,052,173
PRESELECTED APERTURE DIAPHRAGM MECHANISM
Filed Feb. 1, 1961

INVENTOR.
Eduard Andres
BY
*Klein and Packson*
ATTORNEYS

United States Patent Office 3,052,173
Patented Sept. 4, 1962

3,052,173
PRESELECTED APERTURE DIAPHRAGM
MECHANISM
Eduard Andres, Soetlingen, Riedwiesenweg, Germany, assignor to Metallwerk Glockerau G.m.b.H., Ulm (Danube), Germany
Filed Feb. 1, 1961, Ser. No. 86,545
6 Claims. (Cl. 95—64)

The present invention relates to a fully automatic spring stop down diaphragm for an objective for still and movie cameras, particularly for interchangeable objectives of reflex cameras, and more particularly to a mechanism for controlling the preselected diaphragm aperture.

This is a continuation-in-part of my copending application Serial No. 798,718, filed March 11, 1959, and now abandoned.

In my copending application, I have described an attachment for a camera objective, which comprises control means for preselecting a desired diaphragm aperture, means for holding the aperture at a maximum opening, and a pressure actuated diaphragm release member which, when actuated, disengages the means for holding the aperture at the maximum opening and automatically permits it to assume the preselected aperture. As is known in mechanisms of this type, the diaphragm release member is positioned adjacent and coaxial with the shutter release so as to operate the releases simultaneously upon depression of the diaphragm release member.

With an automatic diaphragm setting mechanism of this type, the diaphragm aperture may be held at a maximum opening, for instance for view finding purposes, and, upon pressure being exerted upon a push button diaphragm release member, the diaphragm springs to its preselected stop immediately before the shutter opens while release of the push button promptly returns the diaphragm to its maximum opening.

It is an object of the present invention to improve the means for automatically closing and reopening the diaphragm in such a camera objective attachment and more particularly to improve the control means for the preselection of the aperture of the diaphragm.

Figure 1:
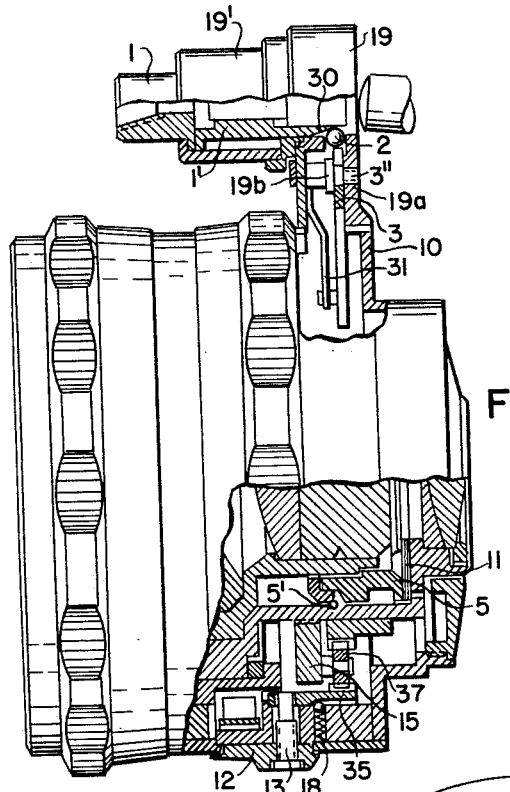
Figure 2:
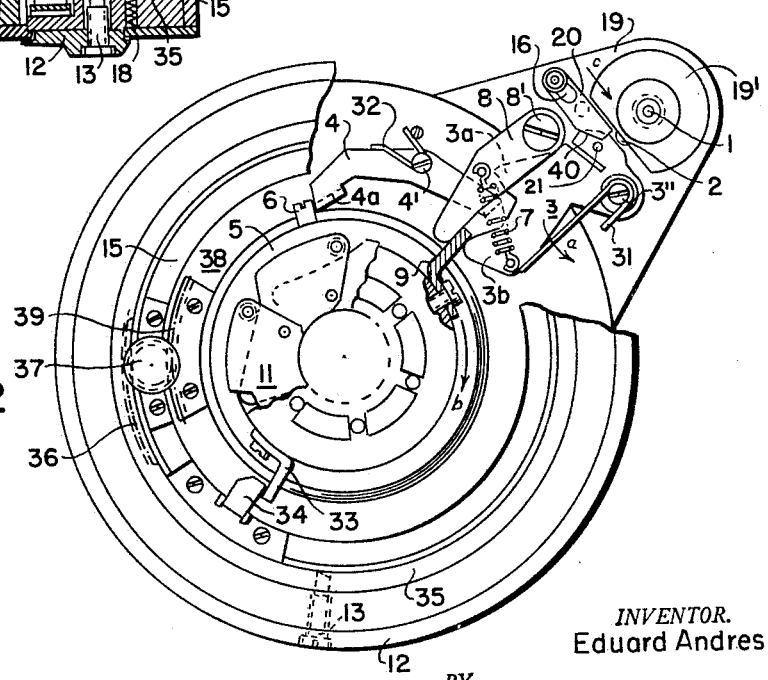

The above and other objects, features and advantages of the invention will become more apparent from the following detailed description of a preferred embodiment thereof, taken in conjunction with the accompanying drawing wherein FIG. 1 is a side view of an objective with an attachment, partly in section, of essential portions of the arrangement according to the invention; and FIG. 2 is a plan view of the mechanism.

In general, the present invention provides an attachment for a photographic objective having a diaphragm which comprises control means for preselecting the diaphragm aperture, means for retaining the aperture at a maximum opening, and a pressure-actuated diaphragm release member. The diaphragm aperture preselector means comprises a preselector ring and a planetary gear train drivingly connecting the diaphragm control ring with the diaphragm stop ring, said control ring being joined with a pin to the diaphragm preselector ring, whereby setting of the preselector ring adjusts the diaphragm aperture. The means for retaining the aperture at a maximum opening comprises stop means on the diaphragm ring and movable detent means engageable with the stop means for retaining the aperture at the maximum opening and disengageable therefrom for automatically permitting the aperture to assume its preselected opening. The diaphragm release member is a push button mounted on an extension of the attachment. On the extension of the attachment a first lever means is mounted and coupling means is provided between the push button and the first lever means. Pressure exerted on the diaphragm release lever means. Pressure exerted on the diaphragm release is transmitted via the coupling means to the first lever, thus pivoting the latter in the direction of arrow $a$. A projection of the first lever presses against the end of a retaining lever and discontinues the retaining action. A second lever is also mounted on the extension of the attachment and is in engagement with a driver bracket means on the diaphragm ring to move the diaphragm ring to the preselected aperture upon discontinuance of the retaining action. Both levers are coupled together in a force locked manner by a spring. The first lever is engageable with the driver bracket and is disengageable from same upon pressure actuation of the diaphragm release. Thereby, the spring coupling together the first and second lever is prestressed, and, upon discontinuance of the retaining action, the second lever moves under action of this spring the diaphragm ring to the preselected aperture. After release of the diaphragm release the diaphragm is automatically returned to the maximum aperture.

Referring now to the drawing, there is shown an objective attachment 10 having an extension 19 with a sleeve 19' which constitutes a bearing for the diaphragm release member 1. The illustrated release member is a push button which is axially movable in its bearing and has an extension sleeve 1' with a frusto-conical or bevelled end surface 30.

Normally and when the push button 1 is not actuated, the maximum diaphragm aperture is maintained with the diaphragm ring 5 retained in this position by means of a stop 6 engaged by end 4$a$ of movable lever 4. The illustrated stop means is a screw 6 mounted on the diaphragm ring and the retaining action is carried out by lever 4 pivoted at 4' and so biased by spring 32 that its end 4$a$ normally engages the stop screw 6.

Pressure actuation of the push button stops down the aperture to its preselected opening in the following manner:

A first lever means 3 is pivotally mounted on the attachment extension 19 by means of threaded bolt 3", lever 3 being held against axial displacement by the attachment side wall 19$a$ and the screw head 19$b$. A coupling means consisting of a ball 2 is arranged between the bevelled end surface of the extension sleeve 1' of the push button 1 and the lever 3, spring 31 biasing the lever against the ball 2, i.e., in a clockwise direction, as seen in FIG. 2. When the ball is displaced radially inwardly by pressure actuation of push button 1, it pivots lever 3 against the bias of spring 31 in a counter-clockwise direction indicated by arrow $a$. This causes the projection 3$a$ of the lever to engage and move one end of two-armed lever 4, thus pivoting the lever against the bias of its spring 32 and disengaging the other end 4$a$ of the lever from stop 6, permitting the diaphragm ring 5 to rotate in the direction of arrow $b$.

The rotation of the diaphragm ring is effected automatically by lever 8 engaging the driver bracket 9, said lever 8 being also pivotally mounted on the attachment extension 19 by means of a threaded bolt 8'. After disengagement of the first lever 3 from the driver bracket 9 through pressure actuation of the diaphragm release 1, the spring 7 is prestressed so that lever 8 urges the diaphragm ring to assume instantaneously the preselected aperture upon discontinuance of the retaining action of elements 4–6 and engagement with the driver bracket 9 screwed to the diaphragm ring 5.

The preselection of the diaphragm aperture is effected by a preselector ring 12. Threaded bolt 13 fixedly connects the diaphragm aperture preselector ring 12 with the diaphragm control ring 35 so that the preselector ring 12 and the diaphragm control ring 35 always move together. Diaphragm stop ring 15 carries the dog 34 whose position may be adjusted by turning the preselector ring 12 so as to preselect the desired diaphragm aperture. Rotation of the diaphragm ring 5 by lever 8 is effected under the action of the prestressed spring 7 upon discontinuance of the retaining action of element 4–6 until stop bracket 33, which is fixed to diaphragm ring 5, engages dog 34. Now the diaphragm is stopped down to the preselected aperture.

The diaphragm aperture preselection is effected by a planetary gear drive which will now be described. The planet gear 37 is rotatably mounted on diaphragm stop ring 15 and engages the arcuate gear 36 in the internal surface of diaphragm control ring 35 as well as the arcuate gear 39 provided in the external surface of the objective barrel 38. Since the planetary gear ratio is 2:1 a wider spacing is the proportion 2:1 of the graduation on the preselector ring scale may be obtained, which makes finer adjustment of intermediate aperture values possible.

Prompt and automatic return of the diaphragm aperture to its maximum opening upon release of the push button 1 is assured in the following manner:

The lever 3 has a second projection 3b which is biased against the driver bracket 9 by spring 31. Upon release of the pressure from the push button, spring 31 automatically moves lever 3 clockwise and presses projection 3b against the driver bracket 9 to rotate the diaphragm ring counter-clockwise under the pressure of spring 31 into the normal, wide open position of the aperture, whereupon the lever 4 snaps back into engagement with stop 6 to reassume its detent function and to maintain the diaphragm aperture at its maximum opening.

If desired, the release member for operation of the diaphragm mechanism may be disconnected simply by means of slide 20 which is displaceably mounted in slot 16 on the extension 19. The slide has an oblique or wedge-like end surface 40 adapted to engage pin 21 on lever 3 upon movement in the direction of arrow c. When the slide presses against the lever pin 21, lever 3 is pivoted counter-clockwise and actuates lever 4 by means of the projection 3a to disengage its end 4a from the stop screw 6. Under the action of the prestressed spring 7 the lever 8 engaging the driver bracket 9 rotates the diaphragm ring 5 until stop bracket 33 engages dog 34. When now the diaphragm preselector ring 12 is rotated, the diaphragm does not remain in the maximum aperture but assumes the desired preselected value. Through disengagement of the automatic release mechanism the diaphragm does not spring in a flash from the maximum aperture to the preselected stop, but the diaphragm operates as a normal click stop diaphragm. Even now it is still possible to depress the diaphragm release 1 to operate the camera shutter release. When the slide is moved out to release its wedge action, the automatic release mechanism operates as hereinabove described.

When the objective is adjusted for close up shots, it is displaced along the optical axis a certain length in conformity with the focal length. Stop 6, driver bracket 9 and the stop bracket 33 are fixed to the diaphragm ring 5 and therefore, are displaced with the objective. Therefore, the end 4a of the lever 4, the driver bracket 9 and the stop bracket 33 have extensions for slidable contact, while adjusting the diaphragm from ∞ to close up setting, which extend for the length of the extension of the object to maintain contact with the levers 3, 4, 8 and the dog 34.

While the invention has been described in connection with a single preferred embodiment, it will be clearly understood that many modifications and variations may occur to the skilled in the art without departing from the spirit and scope of the invention as defined in the appended claims.

I claim:

1. A photographic objective having a diaphragm ring, an attachment thereto, means for retaining the diaphragm ring in a position wherein the diaphragm aperture has a maximum opening, said retaining means including a fixed stop means on the diaphragm ring and a movable detent lever mounted on the attachment and engageable with the stop means for retaining the diaphragm ring in said position and disengageable for permitting rotation of the diaphragm ring; a pressure actuated diaphragm release member mounted on the attachment; a first lever means mounted on the attachment; coupling means arranged between the diaphragm release member and the first lever means, the first lever means being moved in one direction upon pressure actuation of the diaphragm release member so that the first lever means presses against the detent lever and disengages it from the stop means; a diaphragm aperture preselector means including a preselector ring, a diaphragm control ring fixedly connected to the preselector ring, a diaphragm stop ring and a planetary gear drivingly connecting the diaphragm control and stop rings; a second lever means mounted on the attachment; a spring coupling together the first and second lever means; another stop means fixed on the diaphragm ring and engaged by the first and second lever means, the spring being stressed by movement of the first lever means in said one direction and the resultant spring bias acting on the second lever means for effecting said rotation of the diaphragm ring instantaneously; and a third stop means fixed on the diaphragm ring and determining the preselected aperture upon engagement of said third stop means with the diaphragm stop ring, release of the pressure on said release member automatically causing said first lever means to move into a direction opposite to said one direction and thus returning the diaphragm to said maximum opening position.

2. The objective of claim 1, wherein said planetary gear includes a planet gear rotatably mounted on the diaphragm stop ring, an internal arcuate gear on the diaphragm control ring, and an external arcuate gear fixedly mounted on the objective barrel, on which the planet gear trundles and thus moves the diaphragm stop ring into the respective diaphragm preselection setting upon rotation of the diaphragm preselector ring.

3. The objective of claim 1, comprising an adjustable slide mounted on the attachment for moving the first lever means in the one direction and thus releasing the first-named stop means from the detent lever so that the second lever means rotates the diaphragm ring and brings the third stop means into engagement with the diaphragm stop ring, thus enabling the setting of any diaphragm aperture through rotation of the diaphragm preselector ring.

4. The objective of claim 1, wherein said spring positively couples the first and second lever means so as to bias them in opposite directions.

5. The objective of claim 1, further comprising slide means mounted thereon for displacement to disengage the first lever means from the coupling means and simultaneously to pivot the first lever means against the movable detent lever and to disengage the detent lever from the first stop means whereby the diaphragm ring is driven under the bias of the second lever means to the preselected diaphragm aperture.

6. The objective of claim 1, wherein said movable detent lever is a two-armed lever pivoted on the attachment, one arm of the lever cooperating with the first stop means and the other arm of the lever being engageable by said first lever means.

References Cited in the file of this patent

UNITED STATES PATENTS

| | | |
|---|---|---|
| 2,777,371 | Schutz | Jan. 15, 1957 |
| 2,803,182 | Werner | Aug. 20, 1957 |
| 2,805,610 | Haupt | Sept. 10, 1957 |
| 2,861,506 | Leder et al. | Nov. 25, 1958 |
| 2,966,105 | Schutz | Dec. 27, 1960 |